(12) United States Patent
Hundemer

(10) Patent No.: US 10,142,583 B1
(45) Date of Patent: Nov. 27, 2018

(54) COMPUTING SYSTEM WITH EXTERNAL SPEAKER DETECTION FEATURE

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 80 days.

(21) Appl. No.: 15/295,191

(22) Filed: Oct. 17, 2016

Related U.S. Application Data

(60) Provisional application No. 62/242,593, filed on Oct. 16, 2015.

(51) Int. Cl.
*H04N 5/77* (2006.01)
*H04R 29/00* (2006.01)

(52) U.S. Cl.
CPC ............. *H04N 5/77* (2013.01); *H04R 29/001* (2013.01); *H04R 2420/05* (2013.01); *H04R 2420/07* (2013.01)

(58) Field of Classification Search
CPC . H04N 5/60; H04N 5/772; H04N 5/77; H04R 29/001
See application file for complete search history.

(56) References Cited

U.S. PATENT DOCUMENTS

| | | | | |
|---|---|---|---|---|
| 6,104,819 A | * | 8/2000 | Nickum | H04R 1/1041 381/123 |
| 6,212,275 B1 | * | 4/2001 | Akhteruzzaman | H04M 9/08 379/351 |
| 6,437,230 B2 | * | 8/2002 | Torii | G10H 1/0091 381/103 |

(Continued)

FOREIGN PATENT DOCUMENTS

| | | | |
|---|---|---|---|
| JP | 06-253186 | * | 9/1994 |
| JP | 2007312030 A | * | 11/2007 |
| WO | WO 03/074982 A1 | * | 9/2003 |

OTHER PUBLICATIONS

Ida, Machine generated translation of JP 06-253186, Sep. 1994.*

*Primary Examiner* — David E Harvey
(74) *Attorney, Agent, or Firm* — McDonnell Boehnen Hulbert & Berghoff LLP

(57) ABSTRACT

In one aspect, an example method includes (i) making a determination of whether an external speaker is connected to a computing system via an audio communication interface; (ii) based on the determination, selecting an operational mode from among a first operational mode and a second operational mode, wherein (a) when the computing system operates in the first operational mode, the computing system disables output of the received audio content via the internal speaker and enables transmission of the received audio content via the audio communication interface for output by the external speaker, and (b) when the computing system operates in the second operational mode, the computing (Continued)

system disables output of the received audio content via the internal speaker and disables transmission of the received audio content via the audio communication interface for output by the external speaker; and (iii) causing the computing system to operate in the selected operational mode.

20 Claims, 7 Drawing Sheets

(56) References Cited

U.S. PATENT DOCUMENTS

| | | | | |
|---|---|---|---|---|
| 8,902,315 B2* | 12/2014 | Fisher | | H04M 1/6066 348/164 |
| 2003/0134666 A1* | 7/2003 | Fletcher | | H04M 1/725 455/575.2 |
| 2004/0101148 A1* | 5/2004 | Pyle | | H03G 5/00 381/101 |
| 2009/0046210 A1* | 2/2009 | Sakamoto | | H04L 12/2809 348/738 |
| 2009/0136211 A1* | 5/2009 | Kikukawa | | H04N 5/772 386/248 |
| 2010/0098261 A1* | 4/2010 | Norhammar | | H04M 1/6066 381/59 |
| 2010/0115563 A1* | 5/2010 | Nada | | H04N 7/106 725/78 |
| 2011/0141357 A1* | 6/2011 | Price | | H04N 21/41 348/552 |
| 2012/0194635 A1* | 8/2012 | Kubicka | | H04L 12/1813 348/14.12 |
| 2015/0296061 A1* | 10/2015 | Geiger | | H04M 1/0258 348/14.12 |
| 2016/0173985 A1* | 6/2016 | Shintani | | H04N 21/4884 381/77 |
| 2016/0353194 A1* | 12/2016 | Stevens | | H04R 1/1041 |

\* cited by examiner

COMPUTING SYSTEM WITH EXTERNAL SPEAKER DETECTION FEATURE

RELATED DISCLOSURES

This disclosure claims priority to U.S. Provisional Patent Application No. 62/242,593, titled "Video Production System with Content-Related Features," filed on Oct. 16, 2015, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) capturing, by a camera of a first computing system, video content; (ii) transmitting, by the first computing system, the captured video content to a second computing system; and (iii) while transmitting the captured video content to the second first computing system: receiving, by the first computing system, audio content, wherein the first computing system comprises an internal speaker and an audio communication interface configured to allow the first computing system to connect with an external speaker; making, by the first computing system, a determination of whether the external speaker is connected to the first computing system via the audio communication interface; based on the determination, selecting, by the first computing system, an operational mode from among a set of at least two operational modes comprising a first operational mode and a second operational mode, wherein (a) when the first computing system operates in the first operational mode, the first computing system disables output of the received audio content via the internal speaker and enables transmission of the received audio content via the audio communication interface for output by the external speaker, and (b) when the first computing system operates in the second operational mode, the first computing system disables output of the received audio content via the internal speaker and disables transmission of the received audio content via the audio communication interface for output by the external speaker; and causing, by the first computing system, the first computing system to operate in the selected operational mode.

In another aspect, an example non-transitory computer-readable medium is disclosed. The computer-readable medium has stored thereon program instructions that upon execution by a processor, cause performance of a set of acts including (i) capturing, by a camera of a first computing system, video content; (ii) transmitting, by the first computing system, the captured video content to a second computing system; and (iii) while transmitting the captured video content to the second first computing system: receiving, by the first computing system, audio content, wherein the first computing system comprises an internal speaker and an audio communication interface configured to allow the first computing system to connect with an external speaker; making, by the first computing system, a determination of whether the external speaker is connected to the first computing system via the audio communication interface; based on the determination, selecting, by the first computing system, an operational mode from among a set of at least two operational modes comprising a first operational mode and a second operational mode, wherein (a) when the first computing system operates in the first operational mode, the first computing system disables output of the received audio content via the internal speaker and enables transmission of the received audio content via the audio communication interface for output by the external speaker, and (b) when the first computing system operates in the second operational mode, the first computing system disables output of the received audio content via the internal speaker and disables transmission of the received audio content via the audio communication interface for output by the external speaker; and causing, by the first computing system, the first computing system to operate in the selected operational mode.

In another aspect, an example first computing system is disclosed. The first computing system is configured for performing a set of acts including (i) capturing, by a camera of the first computing system, video content; (ii) transmitting, by the first computing system, the captured video content to a second computing system; and (iii) while transmitting the captured video content to the second first computing system: receiving, by the first computing system, audio content, wherein the first computing system comprises an internal speaker and an audio communication interface configured to allow the first computing system to connect with an external speaker; making, by the first computing system, a determination of whether the external speaker is connected to the first computing system via the audio communication interface; based on the determination, selecting, by the first computing system, an operational mode from among a set of at least two operational modes comprising a first operational mode and a second operational mode, wherein (a) when the first computing system operates in the first operational mode, the first computing system disables output of the received audio content via the internal speaker and enables transmission of the received audio content via the audio communication interface for output by the external speaker, and (b) when the first computing system operates in the second operational mode, the first computing system disables output of the received audio content via the internal speaker and disables transmission of the received audio content via the audio communication interface for output by the external speaker; and causing, by the first computing system, the first computing system to operate in the selected operational mode.

In one aspect, another example method is disclosed. The method includes (i) receiving, by a first computing system, audio content; (ii) making, by the first computing system, a determination of whether an external speaker is connected to a second computing system via an audio communication interface of the second computing system; (iii) based on the determination, selecting, by the first computing system, an operational mode from among a set of at least two operational modes comprising a first operational mode and a second operational mode, wherein (a) when the first computing system operates in the first operational mode, the first computing system enables transmission of the received audio content to the second computing system for output by the external speaker, and (b) when the first computing system operates in the second operational mode, the first computing system disables transmission of the received audio content to the second computing system; and (iv) causing, by the first computing system, the first computing system to operate in the selected operational mode.

In another aspect, another example non-transitory computer-readable medium is disclosed. The computer-readable medium has stored thereon program instructions that upon execution by a processor, cause performance of a set of acts including (i) receiving, by a first computing system, audio content; (ii) making, by the first computing system, a determination of whether an external speaker is connected to a second computing system via an audio communication interface of the second computing system; (iii) based on the determination, selecting, by the first computing system, an operational mode from among a set of at least two operational modes comprising a first operational mode and a second operational mode, wherein (a) when the first computing system operates in the first operational mode, the first computing system enables transmission of the received audio content to the second computing system for output by the external speaker, and (b) when the first computing system operates in the second operational mode, the first computing system disables transmission of the received audio content to the second computing system; and (iv) causing, by the first computing system, the first computing system to operate in the selected operational mode.

In another aspect, an example first computing system is disclosed. The first computing system is configured for performing a set of acts including (i) receiving, by the first computing system, audio content; (ii) making, by the first computing system, a determination of whether an external speaker is connected to a second computing system via an audio communication interface of the second computing system; (iii) based on the determination, selecting, by the first computing system, an operational mode from among a set of at least two operational modes comprising a first operational mode and a second operational mode, wherein (a) when the first computing system operates in the first operational mode, the first computing system enables transmission of the received audio content to the second computing system for output by the external speaker, and (b) when the first computing system operates in the second operational mode, the first computing system disables transmission of the received audio content to the second computing system; and (iv) causing, by the first computing system, the first computing system to operate in the selected operational mode.

DETAILED DESCRIPTION

I. Overview

Figure 1:
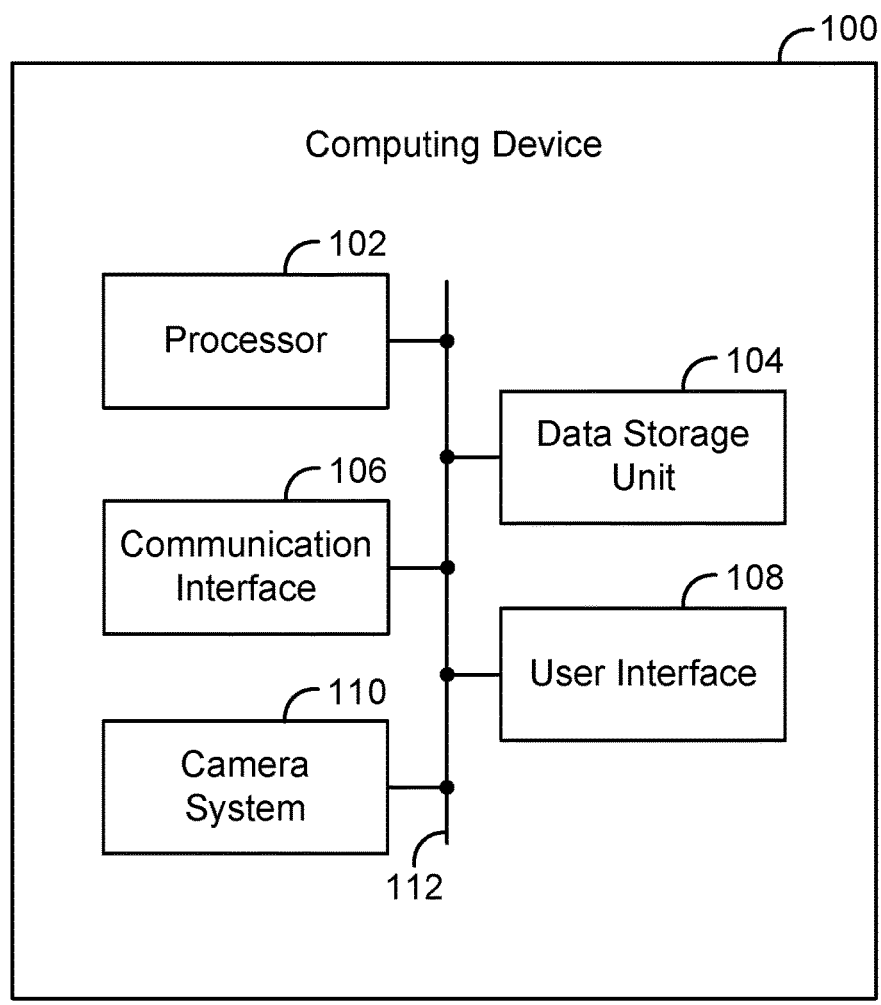
FIG. 1 is a simplified block diagram of an example computing device.

A VPS can generate video content that can serve as or be part of a media program (e.g., a news program). The VPS can then transmit the video content to a video-broadcast system (VBS), which in turn can transmit the video content to a device for presentation of the video content to an end-user.

The VPS can include various components to facilitate generating video content. For example, the VPS can include a video source, a content system, a first DVE system, and a second DVE system.

The video source can generate first video content, and can transmit the first video content to the second DVE system. In one example, the video source can take the form of a video camera directed towards a scene where a news anchor is discussing a news story. Thus, in one example, the process of the video source generating the first video content can involve the video source capturing first video content showing the scene where the news anchor is discussing the news story.

The content system can transmit content, such as a set of images relating to the news story, to the first DVE system. The first DVE system can receive the content, and can execute a DVE, which causes the first DVE system to generate second video content that includes the received content. For example, the generated second video content can show the set of images scrolling from right to left. The first DVE system can then transmit the generated second video content to the second DVE system.

The second DVE system can receive the first video content and the second video content, and can execute a DVE, which causes the DVE system to overlay the second video content on a portion of the first video content, thereby generating third video content. As such, in one example, the third video content can include the scrolling images overlaid on a portion of the scene where the news anchor is discussing the news story. The third video content can serve as or be part of a media program. Thus, in this way, the VPS can integrate content, such as a set of images, into a media program.

The VPS can also include a scheduling system and a sequencing system. The scheduling system can create a program schedule, perhaps based on input received from a user (e.g., a producer or technical director) via a user interface. The sequencing system can process records in the program schedule, and based on the processed records, can control one or more components of the VPS, such as the video source, the content system, the first DVE system, and the second DVE system, to facilitate generating video content, such as in the manner described above.

In one example, an end-user device can capture content (e.g., video and/or audio content) which the VPS can integrate into a media program. In some instances, in can be desirable for a producer of the media program to communicate with the user of the end-user device (referred to herein as the "field reporter"). For example, the producer may want to "coach" the field reporter as the field reporter is capturing content at a scene.

To allow for this type of communication, the content system and the end-user device can establish a communication session. Thus, as the producer provides speech input or other audio content into a microphone of the content system, the content system can receive the audio content and can transmit it to the end-user device. The end-user device can then receive the audio content and can output it via a speaker of the end-user device.

In some instances though, it can be undesirable to have audio content output by a speaker of the end-user device. For example, consider a scenario where the speaker is an internal speaker located proximate a microphone of the end-user device, and where the internal speaker is outputting first audio content (e.g., a producer's speech directed at the field reporter) while the end-user device is using the microphone to capture second audio content (e.g., sounds from a newsworthy event) that is being integrated into a media program. In this scenario, as the first audio content is output by the internal speaker, it can be captured by the microphone in a loop-like fashion, thereby resulting in both the first and second audio content (as opposed to just the second audio content, as likely desired) being integrated into the media program.

In other scenarios, this issue can be less of a concern. For example, consider a scenario where the speaker is an external speaker such as an earphone speaker that is located relatively farther away from the microphone, and where the external speaker is outputting the first audio content while the end-user device is using the microphone to capture the second audio content. In this scenario, given the distance between the microphone and the external speaker, it may be less likely that the first audio content output by the external speaker will be captured by the microphone. As a result it is more likely that the second audio content, but not the first audio content, will be integrated into the media program.

Thus, depending on the scenario, it may be desirable to have the end-user device selectively use or not use the internal speaker and/or selectively use or not use the external speaker. To help allow the end-user device to operate in a desirable manner, the end-user device can operate according to one or more operational modes, each of which can dictate whether the end-user device can use the internal speaker and/or the external speaker.

Further, the end-user device can make a determination of whether the external speaker is connected to the end-user device via the audio communication interface. Then, based on that determination, the end-user device can select an operational mode from among a set of operational modes, and can cause itself to operate according to the selected operational mode.

To illustrate the first and second operational modes, assume that the end-user device receives audio content (e.g., from the content system). When the end-user device operates in the first operational mode, the end-user device disables output of the received audio content via the internal speaker and enables transmission of the received audio content via the audio communication interface for output by the external speaker. In one example, the end-user device operates in this mode when the external speaker is connected to the end-user device. As such, when the external speaker is connected to the end-user device, the end-user device can output the received audio content via the external speaker, but not via the internal speaker.

On the other hand, when the end-user device operates in the second operational mode, the end-user device disables output of the received audio content via the internal speaker and disables transmission of the received audio content via the audio communication interface for output by the external speaker. In one example, the end-user device operates in this mode when the external speaker is not connected to the end-user device. As such, when the external speaker is not connected to the end-user device, the end-user device can refrain from outputting the received audio content via the internal speaker and can also refrain from outputting the received audio content via the external speaker.

Thus, if the end-user device determines that the external speaker is connected to the end-user device, the end-user device can select, and then operate in, the first operational mode. As such, the end-user device can output the received audio content via the external speaker, but not the internal speaker. This can help avoid the undesirable audio content integration problem discussed above.

Further, if the end-user device determines that the external speaker is not connected to the end-user device, the end-user device can select and then operate in the second operational mode. As such, the end-user device can refrain from outputting the received audio content via the internal speaker and can also refrain from outputting the audio content via the external speaker. Although this may mean that the audio content is not provided to the field reporter, this can help avoid the undesirable audio content integration problem discussed above.

II. Example Architecture

A. Computing Device

FIG. 1 is a simplified block diagram of an example computing device 100. The computing device can be configured to perform and/or can perform one or more acts and/or functions, such as those described in this disclosure. The computing device 100 can include various components, such as a processor 102, a data storage unit 104, a communication interface 106, a user interface 108, and/or a camera system 110. Each of these components can be connected to each other via a connection mechanism 112.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions included in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define and/or be part of a discrete software application. In some instances, the computing device 100 can execute program instructions in response to receiving an input, such as an input received via the communication interface 106 and/or the user interface 108. The data storage unit 104 can also store other types of data, such as those types described in this disclosure.

The communication interface 106 can allow the computing device 100 to connect with and/or communicate with another entity according to one or more protocols. In one example, the communication interface 106 can be a wired interface, such as an Ethernet interface or a high-definition serial-digital-interface (HD-SDI). In another example, the communication interface 106 can be a wireless interface, such as a cellular, short-range RF (e.g., BLUETOOTH), or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission. In one example, the communication interface can be an audio communication interface that can allow the computing device 100 to connect with and/or communicate with another entity according to one or more protocols for the purposes of communicating audio content.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, and/or a microphone, and/or output components such as a display device (which, for example, can be combined with a touch-sensitive panel), a sound speaker, and/or a haptic feedback system.

In one example, the speaker can be an internal speaker. For example, in the case where the computing device 100 takes the form of a mobile phone, the internal speaker can be disposed at least partially within a housing of the mobile phone. In another example, the speaker can be an external speaker, which can connect to the computing device 100 via an audio communication interface of the computing device 100. The audio communication interface can be configured to allow the computing device 100 to connect with the external speaker via a wired or wireless connection. For example, the audio communication interface can be a 3.5 mm jack, which can allow the computing device 100 to connect with a headphone and/or earphone speaker having a wired cable with an end that can plug into the 3.5 mm jack. Alternatively, the audio communication interface can be a radio transceiver, which can allow the computing device 100 to connect with a headphone and/or earphone speaker wirelessly (e.g., in accordance with a BLUETOOTH protocol). In some cases, the audio communication interface can include or be coupled to a digital-to-analog converter and/or an analog-to-digital converter, as appropriate.

The camera system 110 can include hardware and/or software components that facilitate capturing and processing content (e.g., individual images and/or video content). For example, the camera system 110 can include a camera, a frame grabber, and an encoder. The camera can capture video content in the form of a series of images or "frames," and can then transmit the video content to the encoder. The frame grabber can interface with the camera to assist in capturing the video content, such as by receiving the video content from the camera and then storing the video content and/or transmitting the video content to the encoder. The encoder can receive the video content from the frame grabber (or, in some instances, directly from the camera), encode the video content to generate a video stream, format the video stream into data packets, and transmit the data packets of the video stream to a memory buffer (e.g., in the data storage unit 104), which can receive and store the data packets. The encoder can encode video content according to various standards. For example, the encoder can encode video content in accordance with the H.264 (MPEG-4 AVC) standard, the MPEG-2 Part 2 standard, or the VP8 standard.

The computing device 100 can take various forms, such as a workstation terminal, a desktop computer, a laptop, a tablet, a mobile phone, a set-top box, and/or a television.

B. Video System

Figure 2:
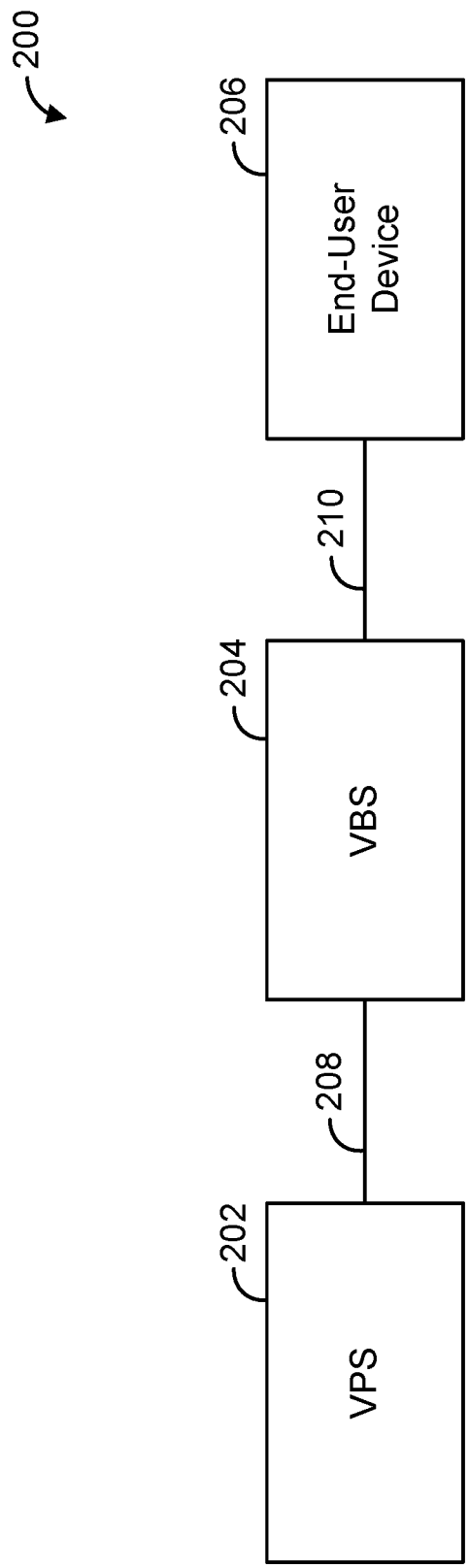
FIG. 2 is a simplified block diagram of an example video system.

FIG. 2 is a simplified block diagram of an example video system 200. The video system 200 can perform various acts and/or functions, and can be implemented as a computing system. In this disclosure, the term "computing system" means a system that includes at least one computing device. In some instances, a computing system can include one or more other computing systems.

The video system 200 can include various components, such as a VPS 202, a VBS 204, and an end-user device 206, each of which can be implemented as a computing system. The video system 200 can also include a connection mechanism 208, which connects the VPS 202 with the VBS 204; and a connection mechanism 210, which connects the VBS 204 with the end-user device 206.

Figure 3:
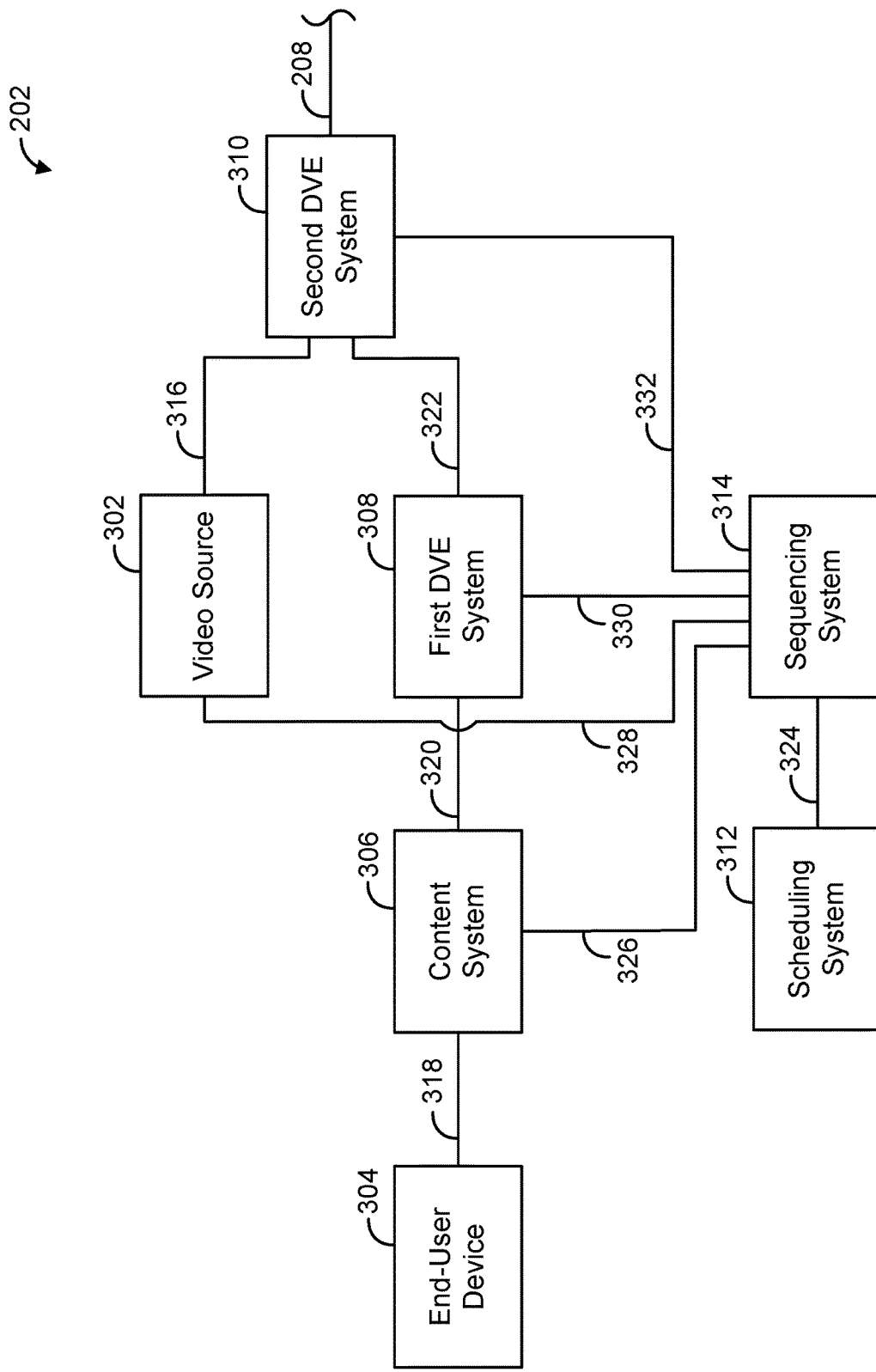
FIG. 3 is a simplified block diagram of an example video-production system (VPS).

FIG. 3 is a simplified block diagram of an example VPS 202. The VPS 202 can include various components, such as a video source 302, an end-user device 304, a content system 306, a first DVE system 308, a second DVE system 310, a scheduling system 312, and a sequencing system 314, each of which can be implemented as a computing system.

The VPS 202 can also include a connection mechanism 316, which connects the video source 302 with the second DVE system 310; a connection mechanism 318, which connects the end-user device 304 with the content system 306; a connection mechanism 320, which connects the content system 306 with the first DVE system 308; a connection mechanism 322, which connects the first DVE system 308 with the second DVE system 310; a connection mechanism 324, which connects the scheduling system 312 with the sequencing system 314; a connection mechanism 326, which connects the sequencing system 314 with the content system 306; a connection mechanism 328, which connects the sequencing system 314 with the video source 302; a connection mechanism 330, which connects the sequencing system 314 with the first DVE system 308; and a connection mechanism 332, which connects the sequencing system 314 with the second DVE system 310.

The video source 302 can take various forms, such as a video camera, a video server, a satellite receiver, or a DVE system. An example video server is the K2 server provided by Grass Valley of San Francisco, Calif.

The end-user device 304 can take various forms. In practice, the VPS 202 is likely to include a large number of end-user devices 304 and corresponding connection mechanisms, each connecting a respective one of the end-user devices 304 with the content system 306. The content system 306 can also take various forms.

The first DVE system 308 can take various forms. An example first DVE system is VIZ TRIO provided by Viz Rt of Bergen, Norway. Another example first DVE system is CASPAR CG provided by the Swedish Broadcasting Corporation.

The second DVE system 310 can take various forms, such as a production switcher. An example production switcher is VISION OCTANE provided by Ross Video Ltd. of Iroquois, Ontario in Canada.

The scheduling system 312 can take various forms. An example scheduling system is WO TRAFFIC provided by WideOrbit, Inc. of San Francisco, Calif. Another example scheduling system is OSI-TRAFFIC provided by Harris Corporation of Melbourne, Fla. A scheduling system is sometimes referred to in the industry as a "traffic system."

The sequencing system 314 can take various forms. A sequencing system is sometimes referred to in the industry as a "production automation system."

Referring back to FIG. 2, the VBS 204 can include various components, such as a terrestrial antenna and/or a satellite transmitter, each of which can be implemented as a computing system.

Each of the video-based entities described in this disclosure can include or be integrated with a corresponding audio-based entity. Also, the video content described in this disclosure can include or be integrated with corresponding audio content.

III. Example Operations

The video system 200, and/or components thereof, can perform various acts and/or functions. Examples of these and related features will now be described.

The video system 200 can perform various acts and/or functions related to video content. For example, the video system 200 can receive, generate, output, and/or transmit video content that can serve as or be part of a media program (e.g., a news program). In this disclosure, the act of receiving, generating, outputting, and/or transmitting video content can occur in various ways and/or according to various standards. For example, the act of receiving, outputting, and/or transmitting video content can include receiving, outputting, and/or transmitting a video stream representing the video content, such as over Internet Protocol (IP) or in accordance with the high-definition serial digital interface (HD-SDI) standard. Likewise, the act of generating video content can include generating a video stream representing the video content. Also, the act of receiving, generating, outputting, and/or transmitting video content can include receiving, generating, outputting, and/or transmitting an encoded or decoded version of the video content.

The VPS 202 can perform various acts and/or functions related to video content production. For example, the VPS 202 can generate and/or output video content, and can transmit the video content to another entity, such as the VBS 204.

Referring again to FIG. 3, the video source 302 can generate and/or output video content, and can transmit the video content to another entity, such as the second DVE system 310. In practice, the VPS 202 is likely to include multiple video sources 302 and corresponding connection mechanisms, each connecting a respective one of the video sources 302 with the second DVE system 310.

As noted above, in one example, the video source 302 can take the form of a video camera. In one example, the video camera can be directed towards a scene where a news anchor is discussing a news story. Thus, in one example, the process of the video source 302 generating video content can involve the video source 302 capturing video content showing the scene where the news anchor is discussing the news story.

As noted above, in another example, the video source 302 can take the form of a video server. A video server can record and/or store video content (e.g., in the form of a file). Further, the video server can retrieve stored video content and can use the retrieved video content to generate and/or output a video stream representing the video content. This is sometimes referred to in the industry as the video server "playing out" the video content. The video server can then transmit the video stream, thereby transmitting the video content, to another entity, such as the second DVE system 310.

The end-user device 304 can perform various acts and/or functions related to various types of content, perhaps based on input received from a user (e.g., a field reporter) via a user interface. For example, the end-user device 304 can capture content (e.g., an image and/or video content) via a camera of the end-user device 304. This can allow the end-user device 304 to capture content of a newsworthy event so that the VPS 202 can integrate the content into a media program.

The end-user device 304 can also store content in a data storage unit (e.g., a data storage unit of the end-user device 304). At a later time, the end-user device 304 can select and/or retrieve the stored content, and can transmit it to another entity, such as the content system 306.

In the case where the end-user device 304 is using a camera to capture video content, in one example, proximate the time that the end-user device 304 is capturing the video content (i.e., without significant delay), the end-user device 304 can transmit the captured video content to the content system 306. This is sometimes referred to in the industry as a "live video transmission" or a "live video stream." Similarly, each of the other entities within the VPS 202 and the VBS 204 can receive content and, proximate the time that the content is being received, generate, output, and/or transmit content to the next entity in the video production path. This can allow for live video transmission through all or part of the video system 200, as desired.

In the case where the end-user device 304 uses a camera to capture content, the end-user device 304 can also generate metadata of the captured content. In one example, the end-user device 304 can generate this metadata proximate a time that the end-user device 304 captures the content.

In one example, the metadata can represent a time at which the end-user device 304 captured at least a portion of the content. For instance, in the case where the content is an image, the metadata can represent a time at which the end-user device 304 captured the image. Alternatively, in the case where the content is video content, the metadata can represent a time at which the end-user device 304 started capturing the video content.

In another example, the metadata can represent a location of the end-user device 304 proximate a time when the end-user device 304 captured at least a portion of the content. For instance, in the case where the content is an image, the metadata can represent a location at which the end-user device 304 captured the image. Alternatively, in the case where the content is video content, the metadata can represent a location at which the end-user device 304 started capturing the video content, or a location at which the end-user device 304 captured a given portion of the video content. In some cases, the metadata can represent multiple locations, with each location representing a location of the end-user device 304 proximate a time when the end-user device 304 captured a respective portion of the video content. Metadata representing a location of the end-user device 304 can take various forms. For example, the metadata can take the form of global positioning system (GPS) coordinates.

The end-user device 304 can store metadata in a data storage unit (e.g., a data storage unit of the end-user device 304), perhaps in a manner that associates the metadata with its corresponding content. At a later time, the end-user device 304 can select and/or retrieve the stored content, and can transmit it to another entity, such as the content system 306. In some examples, in the case where the end-user device 304 performs an operation in connection with content, the end-user device 304 can perform a parallel operation in connection with the metadata of that content. For example, if the end-user device 304 selects, retrieves, and transmits content to the content system 306, the end-user device 304 can also select, retrieve, and transmit the metadata of the content to the content system 306.

Like the end-user device 304, the content system 306 can perform various acts and/or functions related to content, perhaps based on input received from a user (e.g., a producer or technical director) via a user interface. For example, the content system 306 can receive content and can do so in various ways. In one example, the content system 306 can receive content from another entity, such as the end-user device 304.

The content system 306 can also store, select, and/or retrieve content. As such, the content system 306 can store received content in a data storage unit (e.g., a data storage unit of the content system 306), and can then receive the content by selecting and retrieving it from the data storage unit.

The content system 306 can also modify content, and can do so in various ways. Among other things, this can allow the content system 306 to remove vulgarities, personal information, and/or extraneous information that is not suitable or desirable for integration into a media program.

The content system 306 can also transmit content to another entity, such as the first DVE system 308. In this disclosure, receiving and transmitting content can include forwarding the content. Alternatively, receiving and transmitting content can include receiving the content and transmitting a copy of the content. As such, in one example, the content system 306 can receive content from the end-user device 304, and can transmit a copy of the content to the first DVE system 308.

As with the end-user device 304, in the case where the content system 306 performs an operation in connection with content, the content system 306 can perform a parallel operation in connection with the metadata of that content. For example, the content system 306 can modify metadata by adding a unique identification number to the metadata to facilitate managing the corresponding content. The content system 306 can use metadata for various reasons. For example, the content system 306 can receive search terms and can match the search terms to metadata for the purposes of searching for and/or selecting relevant content.

The first DVE system 308 can perform various acts and/or functions related to a DVE, perhaps based on input received from a user (e.g., a producer or technical director) via a user interface. For example, the first DVE system 308 can perform a set of steps based on a DVE template to generate and/or output video content. This is sometimes referred to in the industry as "executing a DVE."

The first DVE system 308 can create and/or modify a DVE template. Further, the first DVE system 308 can store and/or retrieve a DVE template. As such, the first DVE system 308 can store a DVE template in a data storage unit (e.g., a data storage unit of the first DVE system 308), and can then receive the DVE template by selecting and retrieving it from the data storage unit.

In some instances, the first DVE system 308 can use the DVE template and content to generate and/or output video content that includes the content. The first DVE system 308 can receive content to use for this purpose in various ways. For example, the first DVE system 308 can receive content from another entity, such as the content system 306. In another example, the first DVE system 308 can receive content by selecting and retrieving it from a data storage unit (e.g., a data storage unit of the content system 306).

A DVE template can specify how the first DVE system 308 is to receive content. In one example, a DVE template can do so by specifying that the first DVE system 308 is to receive content on a particular input of the first DVE system 308 (e.g., an input that maps to a particular entity, such as the content system 306). In another example, a DVE template can do so by specifying that the first DVE system 308 is to receive content by retrieving it from a particular location of a particular data storage unit (e.g., a data storage unit of the first DVE system 308).

After the first DVE system 308 generates and/or outputs video content, the first DVE system 308 can transmit the video content to another entity, such as the second DVE system 310, and/or can store the video content in a data storage unit (e.g., a data storage unit of the first DVE system 308). As such, in one example, the first DVE system 308 can receive content, can use the content to generate and/or output video content that includes the content, and can transmit the video content to the second DVE system 310.

A DVE template can be configured in various ways and can specify various aspects of a DVE. For example, the DVE template can specify a set of ordered steps and various timing aspects, such as when each step is to start being performed and for how long each step is to be performed. The steps can relate to retrieving and/or arranging content within a specified frame or specified frames of video content. The DVE template can specify that a given step is to start being performed at a predefined time, or that a given step is to start being performed at the occurrence of, or after a time offset from the occurrence of, a particular event, such as the conclusion of the performance of a previous step. In another example, the occurrence of the particular event can be the receipt of input from a user via a user interface. In another example, the occurrence of the particular event can be the receipt of an instruction from the sequencing system 314.

To illustrate various aspects of a DVE, an example DVE will now be discussed. In connection with this example, the first DVE system 308 can execute a DVE that causes the first DVE system 308 to generate video content showing overlay images A, B, C, and D scrolling from right to left over a background image. FIGS. 4A-4D are simplified depictions of example frames of the generated video content at various states of the DVE execution process.

Figure 4A:
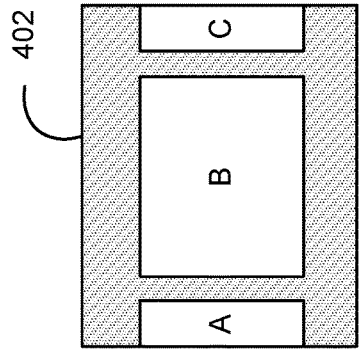
FIG. 4A is a simplified diagram of an example frame of video content, resulting from the performance of a first step in connection with a digital-video effect (DVE).

During a first time period, the first DVE system 308 can perform a first step that involves "moving" from right to left, images A and B until image A is positioned over a center region of the background image. FIG. 4A is a simplified depiction of an example frame 400 at the end of the first time period.

Figure 4B:
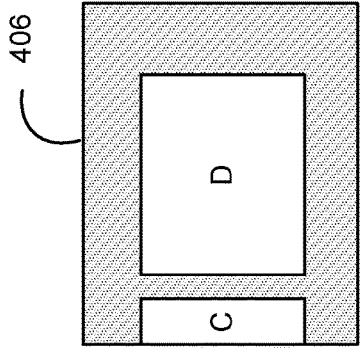
FIG. 4B is a simplified diagram of an example frame of video content, resulting from the performance of a second step in connection with the DVE.

During a next, second time period, the first DVE system 308 can perform a second step that involves "moving" from right to left, images A, B, and C until image B is positioned over the center region of the background image. FIG. 4B is a simplified depiction of an example frame 402 at the end of the second time period.

Figure 4C:
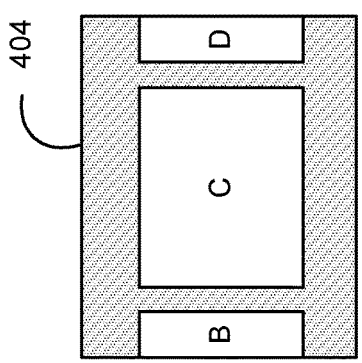
FIG. 4C is a simplified diagram of an example frame of video content, resulting from the performance of a third step in connection with the DVE.

During a next, third time period, the first DVE system 308 can perform a third step that involves "moving" from right to left, images A, B, C, and D until image C is positioned over the center region of the background image. FIG. 4C is a simplified depiction of an example frame 404 at the end of the third time period.

Figure 4D:
FIG. 4D is a simplified diagram of an example frame of video content, resulting from the performance of a fourth step in connection with the DVE.

During a next, fourth time period, the first DVE system 308 can perform a fourth step that involves "moving" from right to left, images B, C, and D until image D is positioned over the center region of the background image. FIG. 4D is a simplified depiction of an example frame 406 at the end of the fourth time period.

As noted above, the DVE template can specify various timing aspects, such as when each step is to start being performed and for how long each step is to be performed. As such, in one example, the DVE template can specify that each step is to be performed for two seconds. Further, the DVE template can specify that the first DVE system 308 is to start performing the first step at a particular time, and that each of steps two, three, and four are to start being performed five seconds after the performance of the previous step has concluded.

As such, at the start time, the first DVE system 308 can begin performing the first step. Two seconds later, the first DVE system 308 can conclude performing the first step (resulting in the generation of frame 400). Five seconds later, the first DVE system 308 can begin performing the second step. Two seconds later, the first DVE system 308 can conclude performing the second step (resulting in the generation of frame 402). Five seconds later, the first DVE system 308 can begin performing the third step. Two seconds later, the first DVE system 308 can conclude performing the third step (resulting in the generation of frame 404). Five seconds later, the first DVE system 308 can begin performing the fourth step. Two seconds later, the first DVE system 308 can conclude performing the fourth step (resulting in the generation of frame 406). Collectively, this results in the each of the images A, B, C, and D scrolling from left to right, but with each image "pausing" in the center region for five seconds before continuing to move left.

It should be appreciated that the first DVE system 308 can execute a wide variety of different types of DVEs, and can thus generate a wide variety of different types of video content. Among other things, a DVE can involve inserting, moving, removing, overlaying, and/or scaling various different types of content, such as text, images, and/or video content, to generate resulting video content.

Like the first DVE system 308, the second DVE system 310 can perform various acts and/or functions related to a DVE, perhaps based on input received from a user (e.g., a producer or technical director) via a user interface. For example, the second DVE system 310 can perform the acts and/or functions described above in connection with the first DVE system 308, but varied as appropriate for use with the second DVE system 310 instead of the first DVE system 308.

Generally, the first DVE system 308 executes certain types of DVEs, and the second DVE system 310 executes other types of DVEs, namely those that are more suited to be executed further downstream in the video production process. However, various DVE-related configurations are possible. For example, either the first DVE system 308 or the second DVE system 310 can perform the acts and/or functions described herein as being performed by the other of the two systems. In another example, the VPS 202 can instead include a single DVE system that provides the functionality of both the first DVE system 308 and the second DVE system 310.

The second DVE system 310 can receive content in various ways. For example, the second DVE system 310 can receive content from another entity, such as the video source 302 and/or the first DVE system 308. In another example, the second DVE system 310 can receive content by selecting and retrieving it from a data storage unit (e.g., a data storage unit of the second DVE system 310).

The second DVE system 310 can execute a DVE based on a DVE template. The DVE template can specify how the second DVE system 310 is to receive content. In one example, the DVE template can do so by specifying that the second DVE system 310 is to receive content on a particular input of the second DVE system 310 (e.g., an input that maps to a particular entity, such as the video source 302 or the first DVE system 308). In another example, the DVE template can do so by specifying that the second DVE system 310 is to receive content by retrieving it from a particular location of a particular data storage unit (e.g., a data storage unit of the second DVE system 310).

As noted above, a DVE template can be configured in various ways. As such, the second DVE system 310 can execute various types of DVEs. In one example, a DVE template can specify that the second DVE system 310 is to receive first video content from the video source 302 and second video content from the first DVE system 308, and is to overlay the received second video content on a portion of the received first video content, thereby generating third video content.

Figure 5A:
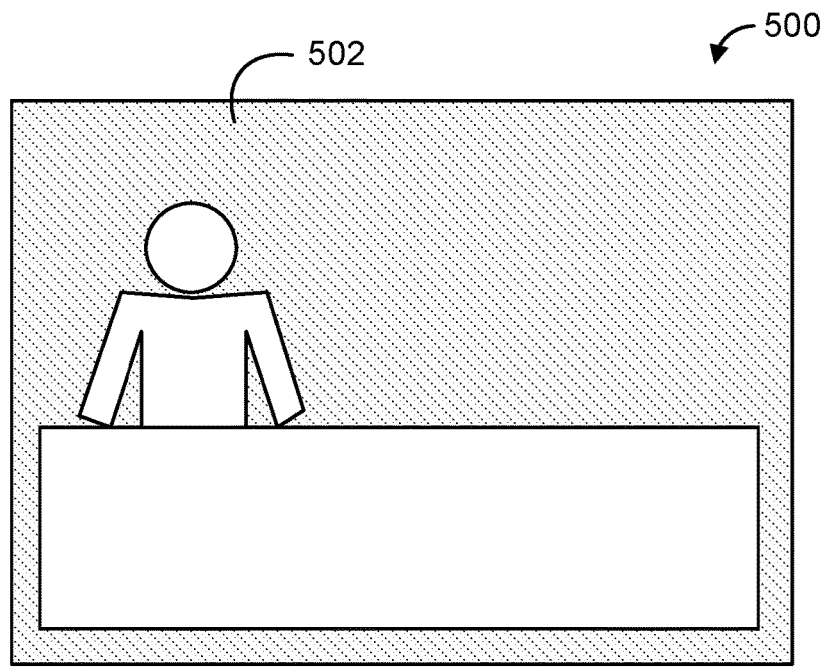
FIG. 5A is a simplified diagram of an example frame of video content, without content overlaid thereon.
Figure 5B:
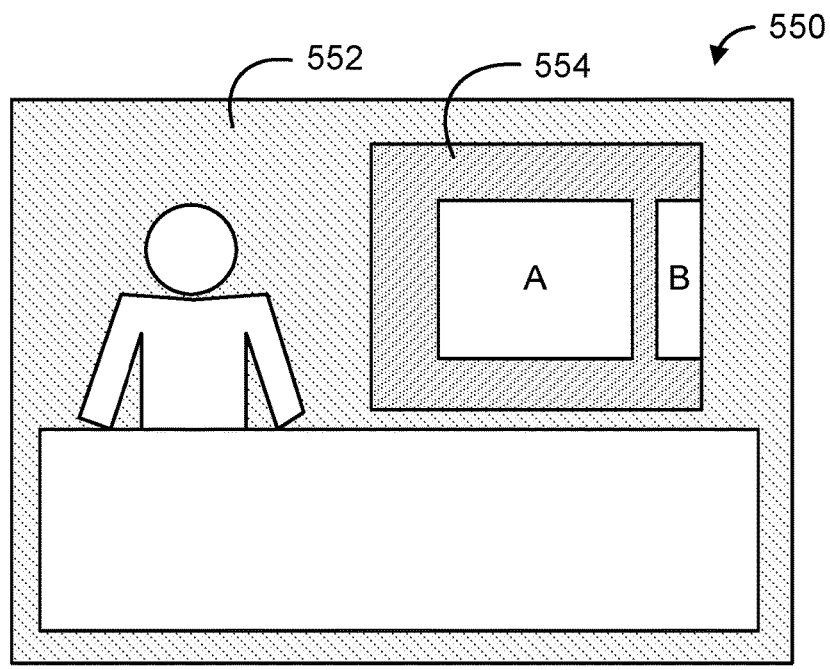
FIG. 5B is a simplified diagram of another example frame of video content, with content overlaid thereon.

FIGS. 5A and 5B help illustrate the concept of overlaying video content on other video content. FIG. 5A is a simplified depiction of an example frame 500 of video content. Frame 500 shows content 502, which is a scene where a news anchor is discussing a news story, but does not include other content overlaid on content 502. For comparison, FIG. 5B is a simplified depiction of another example frame 550 of video content. Frame 550 includes content 552, which is also a scene where a news anchor is discussing a news story, but further includes other content 554 overlaid on a portion of the content 552. In this example, the content 554 shows scrolling images related to the news story, and is overlaid on a portion of the scene where the news anchor is discussing the news story.

After the second DVE system 310 generates and/or outputs the video content, the second DVE system 310 can transmit the video content to another entity, such as the VBS 204, and/or can store the video content in a data storage unit (e.g., a data storage unit of the second DVE system 310).

As discussed above, in one example, the second DVE system 310 can receive first video content that includes content, and can use the first video content to generate and/or output second video content that also includes the content. The second video content can then serve as, or be part of, a media program. As such, this is an example way in which the VPS 202 can integrate content into a media program.

However, the VPS 202 can also integrate content into a media program in other ways. For example, in the case where the video source 302 is a video camera, the first DVE system 308 can generate video content and can transmit the generated video content to a display device located within a field of the view of the video camera. This can allow the video camera to capture video content that includes the generated video content as it is displayed on the display device. Then, by integrating the captured video content into a media program, the VPS 202 can therefore also integrate the generated video content displayed on the display device, into the media program.

In one example, the display device can be integrated with a touch-sensitive panel, which can allow a user (e.g., a news anchor) to interact with the content. To facilitate the user's interaction with the content, the display device and/or related components can perform particular acts and/or functions in response to a user providing certain touch commands.

In one example, the display device can initially display multiple small tiles, each representing a different content item. The position and ordering of the small tiles can be determined by a DVE template, which can specify that certain touch commands cause the display device to perform certain acts and/or functions in connection with the displayed content items. For example, if a user taps on one of the small items a first time, the display device can show the content item in an enlarged view and perhaps show additional elements of, or information associated with, the content item. As the user interacts with the content items displayed on the display device, the video camera can generate video content including these interactions and thereby integrate the content items into the media program.

The scheduling system 312 can perform various acts and/or functions related to the scheduling of video content production, perhaps based on input received from a user (e.g., a producer or technical director) via a user interface. For example, the scheduling system 312 can create and/or modify a program schedule. Further, the scheduling system 312 can store and/or retrieve a program schedule. As such, the scheduling system 312 can store a program schedule in a data storage unit (e.g., a data storage unit of the scheduling system 312), and can then receive the program schedule by selecting and retrieving it from the data storage unit. The scheduling system 312 can also transmit a program schedule to another entity, such as the sequencing system 314.

The sequencing system 314 can process records in the program schedule perhaps based on input received from a user (e.g., a producer or technical director) via a user interface. This can cause the sequencing system 314 to control one or more other components of the VPS 202 to facilitate the VPS 202 generating and/or outputting video content, which can serve as, or be part of, a media program. For example, the sequencing system 314 can control the video source 302, the content system 306, the first DVE system 308, and/or the second DVE system 310 to perform various acts and/or functions, such as those described in this disclosure.

The sequencing system 314 can receive a program schedule in various ways. For example, the sequencing system 314 can do so by receiving it from another entity, such as the scheduling system 312. In another example, the sequencing system 314 can do so by selecting and retrieving it from a data storage unit (e.g., a data storage unit of the scheduling system 312).

A program schedule (sometimes referred to in the industry as a "rundown") serves as a schedule or outline of a media program and can include multiple records. A media program can be conceptually divided into multiple logically-separated portions, sometimes referred to in the industry as "stories." As such, each portion of the media program can be represented by a separate record of the program schedule. In some cases, each record can also include one or more sub-records. Each record (including a sub-record) can include various types of data.

In some instances, the sequencing system 314 can process a next record in the program schedule based on a trigger event. In one example, the trigger event can be the sequencing system 314 completing one or more actions related to a current record in the program schedule. In another example, the trigger event can be the sequencing system 314 receiving input from a user via a user interface.

Referring back to FIG. 2, the VBS 204 can receive video content from the VPS 202, which in turn can transmit the video content to the end-user device 206 for presentation of the video content to an end user. In practice, the video system 200 is likely to include a large number of these end-user devices 206 and corresponding connection mechanisms, each connecting the VBS 204 with a respective one of the end-user devices 206. Thus, in practice, the VBS 204 can transmit video content to a large number of end-user devices 206 for presentation of the video content to a large number of end users.

The VBS 204 can transmit video content to the end-user device 206 in various ways. For example, VBS 204 can transmit video content to the end-user device 206 over-the-air or via a packet-based network such as the Internet. The end-user device 206 can receive video content from the VBS 204, and can present the video content to an end user via a user interface.

As noted above, the end-user device 304 can capture content (e.g., video and/or audio content) which the VPS 202 can integrate into a media program. In some instances, it can be desirable for a producer of the media program (or another user) to communicate with the user of the end-user device 304 (again, referred to herein as the "field reporter"). For example, the producer may want to ask the field reporter to capture certain content. As another example, the producer may want to "coach" the field reporter as the field reporter is capturing content at a scene, such as by asking the field reporter to move or to adjust the way in which the field reporter is holding the end-user device 304.

To allow for this type of communication, which can be a real-time or a near real-time communication, the content system 306 and the end-user device 304 can establish a communication session, such as one based on the Voice over Internet Protocol (VoIP). Thus, as the producer provides speech input or other audio content into a microphone of the content system 306, the content system 306 can receive the audio content and can transmit it to the end-user device 304. The end-user device 304 can then receive the audio content and can output it via a speaker of the end-user device 304.

In some instances though, it can be undesirable to have audio content output by a speaker of the end-user device 304. For example, consider a scenario where the speaker is an internal speaker located proximate (e.g., perhaps within a few inches of) a microphone of the end-user device 304, and where the internal speaker is outputting first audio content (e.g., a producer's speech directed at the field reporter) while the end-user device 304 is using the microphone to capture second audio content (e.g., sounds from a newsworthy event) that is being integrated into a media program. In this scenario, as the first audio content is output by the internal speaker, it can be captured by the microphone in a loop-like fashion, thereby resulting in both the first and second audio content (as opposed to just the second audio content, as likely desired) being integrated into the media program.

In other scenarios, this issue can be less of a concern. For example, consider a scenario where the speaker is an external speaker such as an earphone or headphone speaker that (when the earphone or headphone is worn by the field reporter) is located relatively farther away from the microphone, and where the external speaker is outputting the first audio content while the end-user device 304 is using the microphone to capture the second audio content. In this scenario, given the distance between the microphone and the external speaker, and perhaps due to the nature, orientation, and/or location of the external speaker (which may be located in the field reporter's ear, for instance), it may be less likely that the first audio content output by the external speaker will be captured by the microphone. As a result, it is more likely that the second audio content, but not the first audio content, will be integrated into the media program.

Thus, depending on the scenario, it may be desirable to have the end-user device 304 selectively use or not use the internal speaker and/or selectively use or not use the external speaker. To allow the end-user device 304 to operate in a desirable manner, the end-user device 304 can operate according to one or more operational modes, each of which can dictate whether the end-user device 304 can use the internal speaker and/or whether the end-user device 304 can use the external speaker.

Further, the end-user device 304 can make a determination of whether the external speaker is connected to the end-user device 304 via the audio communication interface. Then, based on that determination, the end-user device 304 can select an operational mode from among a set of operational modes, and can cause itself to operate according to the selected operational mode.

The end-user device 304 can make this determination in various ways. For example, the end-user device 304 can determine that the external speaker is connected to the end-user device 304 by determining that an end of a cable attached to the external speaker is inserted into an input jack of the end-user device 304. As another example, the end-user device 304 can determine that the external speaker is connected to the end-user device 304 by determining that the end-user device 304 is paired with the external speaker (e.g., in accordance with a BLUETOOTH protocol). In some cases, an operating system of the end-user device 304 can make this determination and can provide an indication of the same via an application programming interface (API). Thus, a software application installed on the operation system can make the determination based on the indication made available to it via the API.

As noted above, based on the determination of whether the external speaker is connected to the end-user device 304 via the audio communication interface, the end-user device 304 can select an operational mode from among the set of operational modes, which can include a first operational mode and a second operational mode.

To illustrate the first and second operational modes, assume that the end-user device 304 receives audio content (e.g., from the content system 306). When the end-user device 304 operates in the first operational mode, the end-user device 304 disables output of the received audio content via the internal speaker and enables transmission of the received audio content via the audio communication interface for output by the external speaker. In one example, the end-user device 304 operates in this mode when the external speaker is connected to the end-user device 304. As such, when the external speaker is connected to the end-user device 304, the end-user device 304 can output the received audio content via the external speaker, but not via the internal speaker.

On the other hand, when the end-user device 304 operates in the second operational mode, the end-user device 304 disables output of the received audio content via the internal speaker and disables transmission of the received audio content via the audio communication interface for output by the external speaker. In one example, the end-user device 304 operates in this mode when the external speaker is not connected to the end-user device 304. As such, when the external speaker is not connected to the end-user device 304, the end-user device 304 can refrain from outputting the received audio content via the internal speaker and can also refrain from outputting the received audio content via the external speaker.

As noted above, the end-user device 304 can make a determination of whether the external speaker is connected to the end-user device 304 via the audio communication interface. Then, based on that determination, the end-user device 304 can select an operational mode from among the set of operational modes. For example, if the end-user device 304 determines that the external speaker is connected to the end-user device 304, the end-user device 304 can select and then operate in the first operational mode. As such, the end-user device 304 can output the received audio content via the external speaker, but not the internal speaker. This can help avoid the undesirable audio content integration problem discussed above.

As another example, if the end-user device 304 determines that the external speaker is not connected to the end-user device 304, the end-user device 304 can select and then operate in the second operational mode. As such, the end-user device 304 can refrain from outputting the received audio content via the internal speaker and can also refrain from outputting the audio content via the external speaker. Although this may mean that the audio content is not provided to the field reporter, this can help avoid the undesirable audio content integration problem discussed above.

As an alternative to the end-user device 304 using the determination as a basis to select an operational mode of the end-user device 304, the content system 306 can make the same determination. Such a determination can be used as a basis to select an operational mode of the content system 306. By doing so, the content system 306 can selectively transmit audio content to the end-user device 304 based on whether an external speaker is connected to the end-user device 304.

As such, the content system 306 can make a determination of whether the external speaker is connected to the end-user device 304 via the audio communication interface of the end-user device 304. The content system 306 can make this determination in various ways. For example, the end-user device 304 can make this determination in one of the ways described above, and can transmit an indication of the determination to the content system 306. The content system 306 can receive this indication, which can be used as a basis to make the determination itself.

Based on the determination of whether the external speaker is connected to the end-user device 304 via the audio communication interface, the content system 306 can select an operational mode from among the set of operational modes, which can include a first operational mode and a second operational mode.

To illustrate the first and second operational modes, assume that the content system 306 receives audio content (e.g., in the form of speech input provided by a producer). When the content system 306 operates in the first operational mode, the content system 306 enables transmission of the received audio content to the end-user device 304 for output via the external speaker. In one example, the content system 306 operates in this mode when the external speaker is connected to the end-user device 304. As such, when the external speaker is connected to the end-user device 304, the content system 306 can transmit audio content to the end-user device 304, and the end-user device 304 can output the audio content via the external speaker, but not the internal speaker (as discussed above).

On the other hand, when the content system 306 operates in the second operational mode, the content system 306 disables transmission of the received audio content to the end-user device 304. In one example, the content system 306 operates in this mode when the external speaker is not connected to the end-user device 304. As such, when the external speaker is not connected to the end-user device 304, the content system 306 can refrain from transmitting audio content to the end-user device 304, and thus the end-user device 304 cannot output the audio content via the internal speaker.

As noted above, the content system 306 can make a determination of whether the external speaker is connected to the end-user device 304 via the audio communication interface. Based on that determination, the content system 306 can select an operational mode from among the set of operational modes. For example, if the content system 306 determines that the external speaker is connected to the end-user device 304, the content system 306 can operate in the first operational mode. As such, the content system 306 can transmit audio content to the end-user device 304, and the end-user device 304 can output the audio content via the external speaker, but not the internal speaker (per the end-user device's configuration as discussed above).

As another example, if the content system 306 determines that the external speaker is not connected to the end-user device 304, the content system 306 can operate in the second operational mode. As such, the content system 306 can refrain from transmitting audio content to the end-user device 304, and thus the end-user device 304 cannot output the audio content via the internal speaker. Although this may mean that the audio content is not provided to the field reporter, this can help avoid the undesirable audio content integration problem discussed above.

Figure 6:
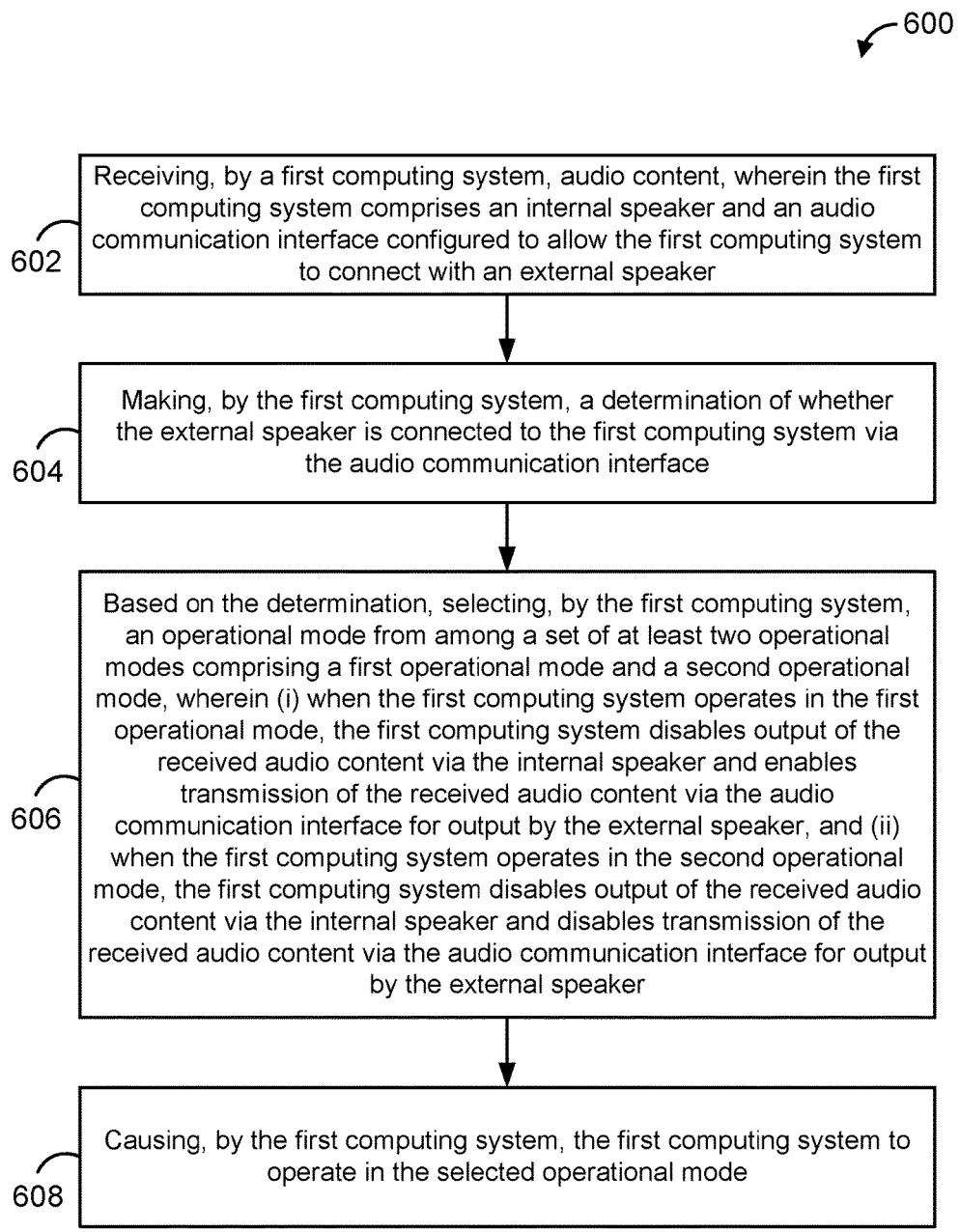
FIG. 6 is a flow chart of an example method.

FIG. 6 is a flow chart illustrating an example method 600.

At block 602, the method 600 can include receiving, by a first computing system, audio content, wherein the first computing system comprises an internal speaker and an audio communication interface configured to allow the first computing system to connect with an external speaker.

At block 604, the method 600 can include making, by the first computing system, a determination of whether the external speaker is connected to the first computing system via the audio communication interface.

At block 606, the method 600 can include based on the determination, selecting, by the first computing system, an operational mode from among a set of at least two operational modes comprising a first operational mode and a second operational mode, wherein (i) when the first computing system operates in the first operational mode, the first computing system disables output of the received audio content via the internal speaker and enables transmission of the received audio content via the audio communication interface for output by the external speaker, and (ii) when the first computing system operates in the second operational mode, the computing system disables output of the received audio content via the internal speaker and disables transmission of the received audio content via the audio communication interface for output by the external speaker.

At block 608, the method 600 can include causing, by the first computing system, the first computing system to operate in the selected operational mode.

In one example, the method 600 can further include capturing, by a camera of the first computing system, video content; and transmitting, by the first computing system, the captured video content to a second computing system. Further, the method can include performing the receiving, making, selecting, and causing acts while transmitting the captured video content to the second computing system. In another example, the method can include performing the making, selecting, and causing acts while the first computing system receives the audio content.

Figure 7:
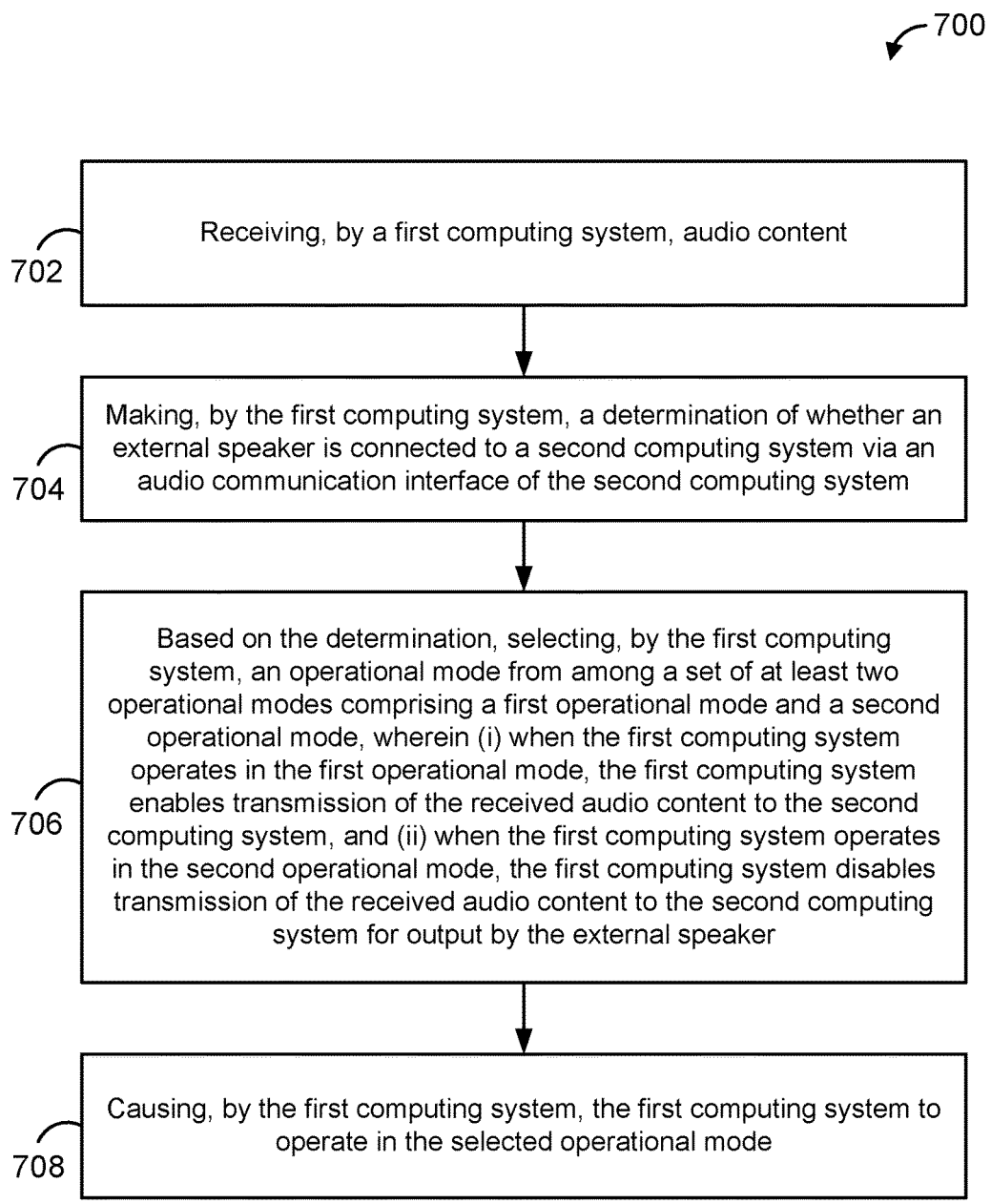
FIG. 7 is a flow chart of an example method.

FIG. 7 is a flow chart illustrating an example method 700.

At block 702, the method 700 can include receiving, by a first computing system, audio content.

At block 704, the method 700 can include making, by the first computing system, a determination of whether an external speaker is connected to a second computing system via an audio communication interface of the second computing system.

At block 706, the method 700 can include based on the determination, selecting, by the first computing system, an operational mode from among a set of at least two operational modes comprising a first operational mode and a second operational mode, wherein (i) when the first computing system operates in the first operational mode, the first computing system enables transmission of the received audio content to the second computing system for output by the external speaker, and (ii) when the first computing system operates in the second operational mode, the first computing system disables transmission of the received audio content to the second computing system.

At block 708, the method 700 can include causing, by the first computing system, the first computing system to operate in the selected operational mode.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
capturing, by a camera of a first computing system, video content;
transmitting, by the first computing system, the captured video content to a second computing system; and
while transmitting the captured video content to the second computing system:
receiving, by the first computing system and from the second computing system, audio content, wherein the first computing system comprises an internal speaker and an audio communication interface configured to allow the first computing system to connect with an external speaker;

making, by the first computing system, a determination of whether the external speaker is connected to the first computing system via the audio communication interface;

based on the determination, selecting, by the first computing system, an operational mode from among a set of at least two operational modes comprising a first operational mode and a second operational mode, wherein (i) when the first computing system operates in the first operational mode, the first computing system disables output of the received audio content via the internal speaker and enables transmission of the received audio content via the audio communication interface for output by the external speaker, and (ii) when the first computing system operates in the second operational mode, the first computing system disables output of the received audio content via the internal speaker and disables transmission of the received audio content via the audio communication interface for output by the external speaker; and causing, by the first computing system, the first computing system to operate in the selected operational mode.

2. The method of claim 1, wherein the audio communication interface is configured to allow the first computing system to connect with the external speaker via a wired connection.

3. The method of claim 1, wherein the audio communication interface is configured to allow the first computing system to connect with the external speaker via a wireless connection.

4. The method of claim 1, wherein making the determination comprises determining that the external speaker is connected to the first computing system via the audio communication interface, and wherein based on the determination, selecting the operational mode comprises, based on the determination, selecting the first operational mode.

5. The method of claim 1, wherein making the determination comprises determining that the external speaker is not connected to the first computing system via the audio communication interface, and wherein based on the determination, selecting the operational mode comprises, based on the determination, selecting the second operational mode.

6. The method of claim 1, wherein receiving the audio content comprises receiving the audio content from the second computing system over Internet Protocol (IP).

7. The method of claim 1, wherein the second computing system is a video-production system.

8. A non-transitory computer-readable medium having stored thereon program instructions that upon execution by a processor, cause performance of a set of acts comprising:

capturing, by a camera of a first computing system, video content;

transmitting, by the first computing system, the captured video content to a second computing system; and while transmitting the captured video content to the second computing system:

receiving, by the first computing system and from the second computing system, audio content, wherein the first computing system comprises an internal speaker and an audio communication interface configured to allow the first computing system to connect with an external speaker;

making, by the first computing system, a determination of whether the external speaker is connected to the first computing system via the audio communication interface;

based on the determination, selecting, by the first computing system, an operational mode from among a set of at least two operational modes comprising a first operational mode and a second operational mode, wherein (i) when the first computing system operates in the first operational mode, the first computing system disables output of the received audio content via the internal speaker and enables transmission of the received audio content via the audio communication interface for output by the external speaker, and (ii) when the first computing system operates in the second operational mode, the first computing system disables output of the received audio content via the internal speaker and disables transmission of the received audio content via the audio communication interface for output by the external speaker; and causing, by the first computing system, the first computing system to operate in the selected operational mode.

9. The non-transitory computer-readable medium of claim 8, wherein the audio communication interface is configured to allow the first computing system to connect with the external speaker via a wired connection.

10. The non-transitory computer-readable medium of claim 8, wherein the audio communication interface is configured to allow the first computing system to connect with the external speaker via a wireless connection.

11. The non-transitory computer-readable medium of claim 8, wherein making the determination comprises determining that the external speaker is connected to the first computing system via the audio communication interface, and wherein based on the determination, selecting the operational mode comprises, based on the determination, selecting the first operational mode.

12. The non-transitory computer-readable medium of claim 8, wherein making the determination comprises determining that the external speaker is not connected to the first computing system via the audio communication interface, and wherein based on the determination, selecting the operational mode comprises, based on the determination, selecting the second operational mode.

13. The non-transitory computer-readable medium of claim 8, wherein receiving the audio content comprises receiving the audio content from the second computing system over IP.

14. The non-transitory computer-readable medium of claim 8, wherein the second computing system is a video-production system.

15. A method comprising:

receiving, by a first computing system and from a second computing system, video content captured by the second computing system;

while receiving the video content captured by the second computing system:

receiving, by the first computing system, audio content;

making, by the first computing system, a determination of whether an external speaker is connected to the second computing system via an audio communication interface of the second computing system;

based on the determination, selecting, by the first computing system, an operational mode from among a set of at least two operational modes comprising a first operational mode and a second operational mode, wherein (i) when the first computing system operates in the first operational mode, the first computing system enables transmission of the received audio content to the second computing system for output by the external speaker, and (ii) when the first computing system operates in the second operational mode, the first computing system disables transmission of the received audio content to the second computing system; and causing, by the first computing system, the first computing system to operate in the selected operational mode.

16. The method of claim 15, wherein making the determination comprises determining that the external speaker is connected to the second computing system via the audio communication interface, and wherein based on the determination, selecting the operational mode comprises, based on the determination, selecting the first operational mode.

17. The method of claim 15, wherein making the determination comprises determining that the external speaker is not connected to the second computing system via the audio communication interface, and wherein based on the determination, selecting the operational mode comprises, based on the determination, selecting the second operational mode.

18. A non-transitory computer-readable medium having stored thereon program instructions that upon execution by a processor, cause performance of a set of acts comprising:

receiving, by a first computing system and from a second computing system, video content captured by the second computing system;

while receiving the video content captured by the second computing system:

receiving, by the first computing system, audio content;

making, by the first computing system, a determination of whether an external speaker is connected to the second computing system via an audio communication interface of the second computing system;

based on the determination, selecting, by the first computing system, an operational mode from among a set of at least two operational modes comprising a first operational mode and a second operational mode, wherein (i) when the first computing system operates in the first operational mode, the first computing system enables transmission of the received audio content to the second computing system for output by the external speaker, and (ii) when the first computing system operates in the second operational mode, the first computing system disables transmission of the received audio content to the second computing system; and causing, by the first computing system, the first computing system to operate in the selected operational mode.

19. The non-transitory computer-readable medium of claim 18, wherein making the determination comprises determining that the external speaker is connected to the second computing system via the audio communication interface, and wherein based on the determination, selecting the operational mode comprises, based on the determination, selecting the first operational mode.

20. The non-transitory computer-readable medium of claim 18, wherein making the determination comprises determining that the external speaker is not connected to the second computing system via the audio communication interface, and wherein based on the determination, selecting the operational mode comprises, based on the determination, selecting the second operational mode.

* * * * *